United States Patent [19]
Jirgal

[11] Patent Number: 6,138,184
[45] Date of Patent: *Oct. 24, 2000

[54] SYSTEM FOR PARALLEL PORT WITH DIRECT MEMORY ACCESS CONTROLLER FOR DEVELOPING SIGNAL TO INDICATE PACKET AVAILABLE AND RECEIVING SIGNAL THAT PACKET HAS BEEN ACCEPTED

[75] Inventor: James J. Jirgal, Houston, Tex.

[73] Assignee: Compaq Computer Corporation, Houston, Tex.

[*] Notice: This patent is subject to a terminal disclaimer.

[21] Appl. No.: 09/286,806

[22] Filed: Apr. 6, 1999

Related U.S. Application Data

[63] Continuation of application No. 08/640,223, Apr. 30, 1996, Pat. No. 5,892,976, which is a continuation of application No. 08/403,585, Mar. 14, 1995, Pat. No. 5,539,917, which is a continuation of application No. 07/431,657, Nov. 3, 1989, abandoned.

[51] Int. Cl.⁷ .................................................. G06F 13/14
[52] U.S. Cl. ........................... 710/25; 710/59; 710/64; 710/23; 709/212; 713/500
[58] Field of Search ................... 710/25, 23, 59, 710/64; 709/212; 713/500

[56] References Cited

U.S. PATENT DOCUMENTS

| | | | |
|---|---|---|---|
| 4,075,691 | 2/1978 | Davis et al. ........................... | 710/64 |
| 4,395,756 | 7/1983 | Daniels .................................. | 710/59 |
| 4,463,421 | 7/1984 | Laws . | |
| 4,639,910 | 1/1987 | Toegel et al. ......................... | 370/366 |
| 4,730,308 | 3/1988 | Friedman et al. .................... | 370/276 |
| 4,755,937 | 7/1988 | Glier . | |
| 4,802,120 | 1/1989 | McCoy ................................. | 713/500 |
| 4,922,416 | 5/1990 | Krishnan et al. .................... | 709/212 |
| 4,989,113 | 1/1991 | Hull . | |
| 5,014,237 | 5/1991 | Masters . | |
| 5,038,282 | 8/1991 | Gilbert . | |
| 5,090,830 | 2/1992 | Kroeger et al. ...................... | 400/719 |
| 5,113,523 | 5/1992 | Colley . | |
| 5,255,238 | 10/1993 | Ichige et al. ......................... | 365/220 |
| 5,539,917 | 7/1996 | Jirgal .................................... | 710/22 |
| 5,892,976 | 4/1999 | Jirgal .................................... | 710/22 |

FOREIGN PATENT DOCUMENTS 62-208121 of 1987 Japan .
62-237556 of 1987 Japan .

OTHER PUBLICATIONS

Derwent Publications Ltd., London, GB, Abstract AU8822202, Week 8924.
PC Magazine, "IBM PS/2 Models 90 and 95 True 486 Power at Last", Feb. 26, 1991, pp. 287–308.
Multi–I/O Card Users Manual, p. 23.
M. Morris Mano, Computer Systems Architecture, 1982, p. 428–434.
Motorola Semiconductor Technical Data Hemos Single–Chip MicroComputer 1985, pp. 4–1 to 4–6.
Intel Product Guide, 1983 p. 29.

*Primary Examiner*—Thomas C. Lee
*Assistant Examiner*—Abdelmoniem Elamin
*Attorney, Agent, or Firm*—Akin, Gump, Strauss, Hauer & Feld, LLP

[57] ABSTRACT

The parallel or printer port in a personal computer can receive data from the memory under the control of the direct memory access (DMA) controller, releasing processor resources. The processor enables the parallel port, which then indicates to the DMA controller the desire to transfer data. A state machine in the parallel port, along with associated circuitry, responds to the transfer of the data to the parallel port and then controls the transfer of the data to the attached device, usually a printer. The state machine causes an interrupt to the processor when the transfer is complete or on receipt of errors from the external device. The state machine also communicates with the DMA controller to repeat the transfer process until the transfer is complete or an error occurs. Various DMA channels and parallel port locations can be used. Direct transfers by the processor are blocked during DMA controller handled transfers.

51 Claims, 10 Drawing Sheets

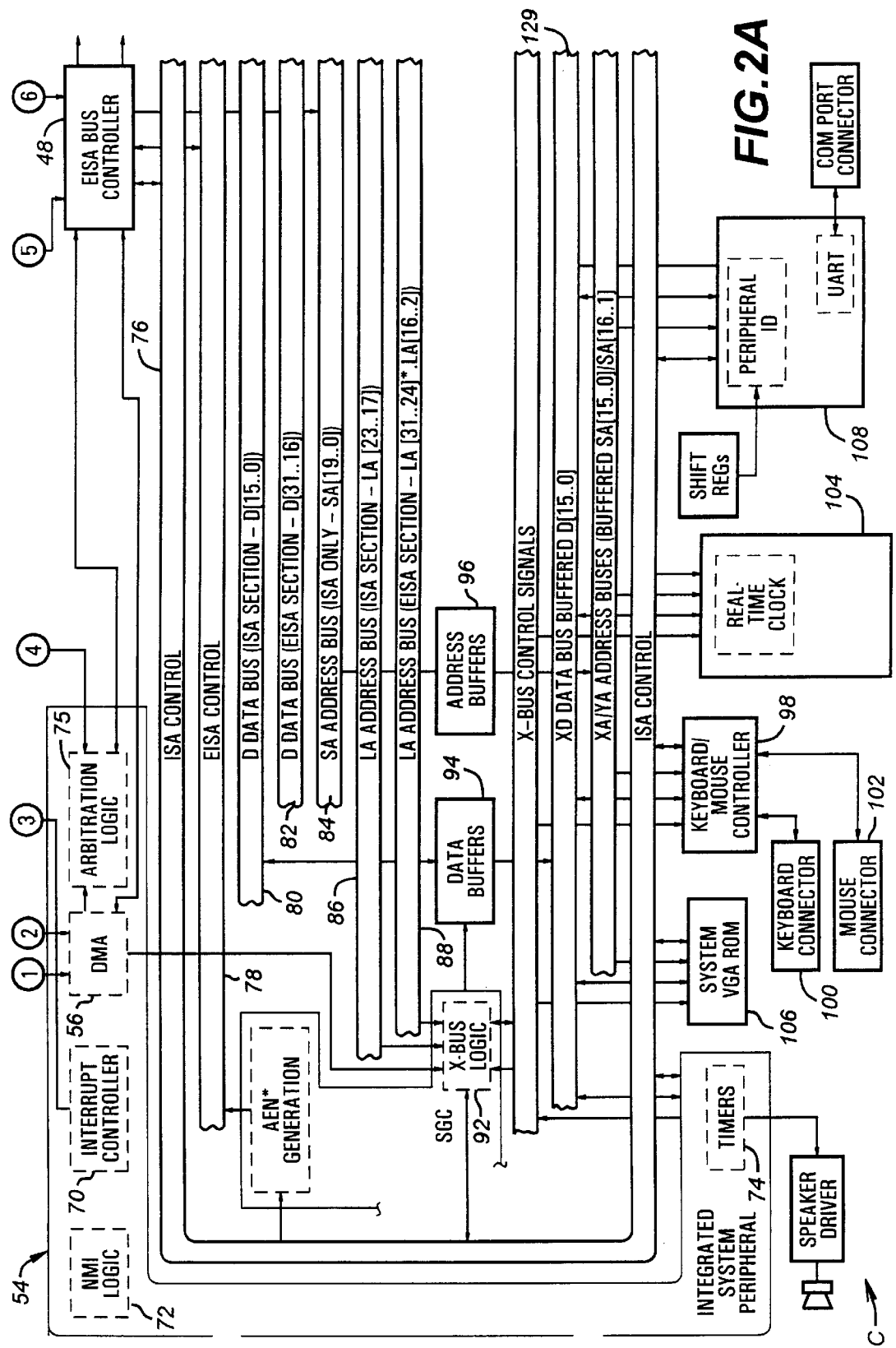

SYSTEM FOR PARALLEL PORT WITH DIRECT MEMORY ACCESS CONTROLLER FOR DEVELOPING SIGNAL TO INDICATE PACKET AVAILABLE AND RECEIVING SIGNAL THAT PACKET HAS BEEN ACCEPTED

This is a continuation of U.S. patent application Ser. No. 08/640,223 filed Apr. 30, 1996 U.S. Pat. No. 5,892,976, which is a continuation of U.S. patent application Ser. No. 08/403,585 (now U.S. Pat. No. 5,539,917) filed Mar. 14, 1995, which is a continuation of U.S. patent application Ser. No. 07/431,657 (now abandoned) filed Nov. 3, 1989.

BACKGROUND OF THE INVENTION

1. Field of the Invention

The present invention relates to parallel ports associated with computer systems and with computer systems containing direct memory access capabilities.

2. Description of the Related Art

Personal computer systems are becoming more powerful with each passing moment. Originally they started out with simple 8 bit microprocessors with 1 MHz clock speeds. Microprocessors have now reached capabilities where they are operating with full 32 bit wide data and have clock rates in excess of 30 MHz. Additionally, with these added capabilities the new uses for personal computers have dramatically expanded beyond those originally envisioned. Personal computer systems are now utilized both as powerful work stations performing computer automated engineering functions with high resolution graphic capabilities and as file servers for local area networks. As more sophisticated software is continually developed the capabilities of the microprocessors are stretched so that as much of the time as possible should be applied to the actual processing tasks requested by the user and as little time as possible to various background functions related to controlling the computer system.

Printing with a personal computer compatible with those developed by International Business Machines Corporation (IBM) is done either over an asynchronous serial communications interface or over a parallel interface, commonly referred to as a Centronics type interface. The parallel interface is generally preferred because higher data throughputs are generally available, which decreases actual printer communication time. The parallel port is an 8 bit wide data port with a clocking or strobe signal and various feedback signals indicating data acknowledgement and device busy, as well as printer status signals such as paper out and printer error. This is a relatively simple and straightforward interface and in fact personal computers built according to the standard developed by IBM for its PC and PC/XT may utilize up to three such ports, referred to as LPT1, LPT2 and LPT3 under the MS-DOS environment.

In the past the microprocessor in the personal computer has been required to directly control the parallel port for each individual byte of data being transferred from the computer system to the printer. This resulted in lost computational time in most cases. To transfer a byte of data over the parallel port, the microprocessor first checks the status port for errors and a not busy state. If there are no errors and the printer is not busy, the microprocessor writes the data to the data port. The microprocessor then writes to the status port to set the data strobe signal. The microprocessor then writes to the status port to clear the data strobe signal. This is the minimum number of steps required for each byte of data. If the microprocessor is operating the print task in foreground mode, where the only task it is operating is the printer function and the entire resource of the personal computer is dedicated to monitoring the parallel port, this loop is acceptable, with additional steps needed only to advance in the data file. However, all other user tasks in the processor are on hold until printing is completed. Thus the entire computer is dedicated to the simple task of printing. If however, the printing function is assigned as a background task, then each time a byte must be transferred from the computer system to the printer, an interrupt handling operation must occur. An interrupt occurs, the microprocessor must branch to the printing code described above, the byte is transferred and the microprocessor returns from the interrupt. Now two tasks can be performed basically simultaneously by the microprocessor but even more overhead is added to the print task and relatively large time slices are removed from the foreground task, decreasing the efficiency of both tasks. As can be seen there are a great deal of processor resources involved in transferring each particular byte. This reduces the available microprocessor resources for use by computer programs requested by the user and thus overall system capabilities.

Also present in current personal computer systems is a direct memory access controller. A direct memory access (DMA) controller allows information to be transferred between memory and input/output (I/O) ports without the interaction of the microprocessor. Thus the use of a DMA controller allows the computer system to perform certain functions without requiring an interrupt or dedication of the microprocessor, thus improving computer system capabilities and efficiency. The DMA controller starts an operation after being set up by the microprocessor and then handles the passing of data between the memory and I/O port until the operation is complete, at which time an interrupt is generated by the peripheral device operating in the I/O port space to inform the microprocessor that the operation is complete.

However, this DMA process has never been assigned to the parallel port in personal computers, thus requiring the above mentioned overhead for the printing of each particular byte of data. This overhead can become quite burdensome when large print queues are developed, as when the personal computer is operating as a file server and thus must handle the high throughput requirements of the file server itself as well as developing printing queues and printing tasks for a large number of users.

SUMMARY OF THE INVENTION

The present invention provides the circuitry necessary to interface the DMA controller with the parallel port to allow printing operations to occur without microprocessor intervention once the DMA controller is programmed. The circuitry includes the necessary logic to develop the DMA request and the interrupt signals used to interface with the DMA controller and the microprocessor and produces the strobe signal provided to the printer to indicate to the printer that data is available. The circuitry recognizes the acknowledge, busy, paper out, select and error signals received from the printer and, in combination with the timing signals received from the DMA controller, produces the necessary output signals to transfer data from memory to the printer. Further, the circuitry preferably includes the data register necessary to store the data which is transferred by the DMA controller from the memory to the I/O port addressed for the particular printer. The circuitry controls the output of the data register to enable the data onto the parallel lines to the printer at the appropriate time when the strobe signal is being presented.

A state machine is used to clock the logic through various states depending upon the present state and given conditions and, with associated combinatorial logic, produces the necessary output signals to inform the printer that it has new data to acknowledge, to inform the DMA controller that another byte of data is requested and to indicate to the microprocessor by means of an interrupt line that either the task is completed or errors have occurred.

BRIEF DESCRIPTION OF THE DRAWINGS

A better understanding of the present invention can be obtained when the following detailed description of the preferred embodiment is considered in conjunction with the following drawings, in which:

FIG. 1, FIG. 2A and FIG. 2B are schematic block diagrams of a computer system incorporating the present invention;

DETAILED DESCRIPTION OF THE PREFERRED EMBODIMENT

Figure 1:
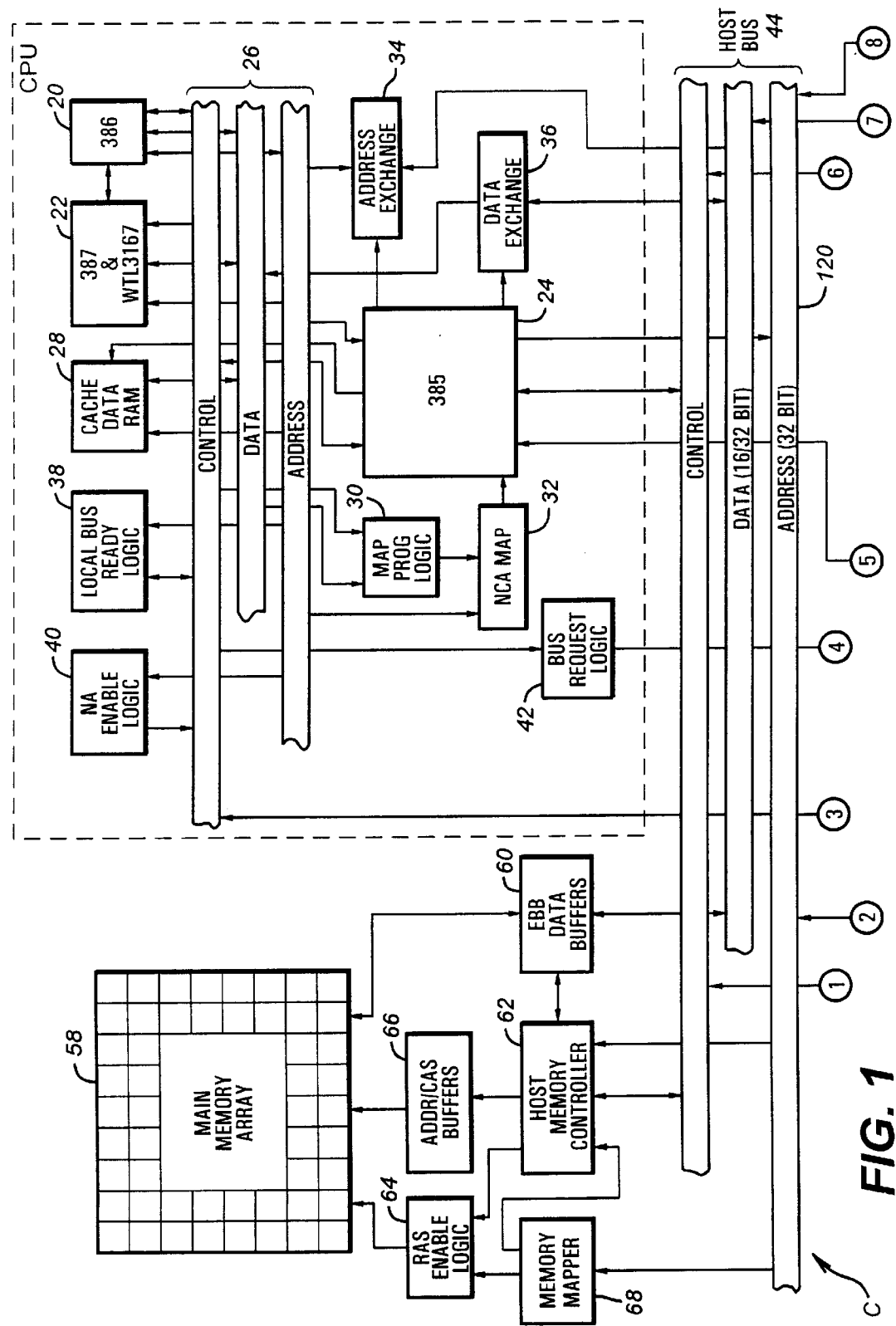
Figure 2B:
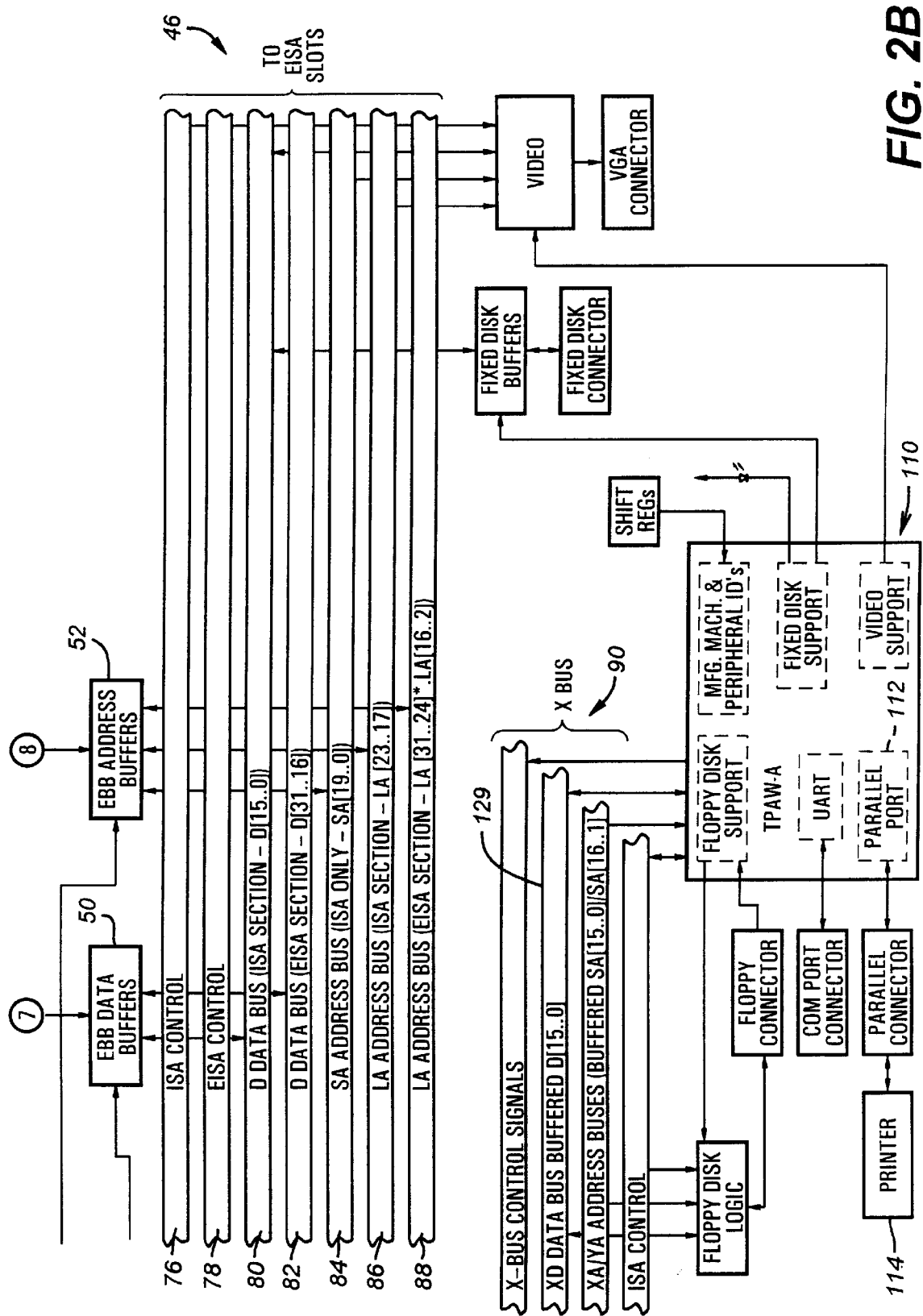

Referring now to FIG. 1, FIG. 2A and FIG. 2B, the letter C designates generally a computer system incorporating the present invention. For clarity, system C is shown in two portions, with the interconnections between FIG. 1, FIG. 2A and FIG. 2B designated by reference to the circled numbers one to eight. System C is comprised of a number of block elements interconnected via four buses. Throughout this specification, signal mnemonics with an asterisk following the signal descriptors indicates the signal is active at a logic low level. Signal mnemonics having numbers or ranges between angled brackets refer to those particular bits or positions in a bus.

In FIG. 1, a computer system is depicted. A central processing unit CPU comprises a processor 20, a numerical coprocessor 22 and a cache memory controller 24 and associated logic circuits connected to a local processor bus 26. Associated with cache controller 24 is high speed cache data random access memory 28, noncacheable memory address map programming logic circuitry 30, noncacheable address memory 32, address exchange latch circuitry 34 and data exchange transceiver 36. Associated with the CPU also are local bus ready logic circuit 38, next address enable logic circuit 40 and bus request logic circuit 42.

The processor 20 is preferably an Intel 80386 microprocessor. The processor 20 has its control, address and data lines interfaced to the local processor bus 26. The coprocessor 22 is preferably an Intel 80387 and/or Weitek WTL 3167 numeric coprocessor interfacing with the local processor bus 26 and the processor 20 in the conventional manner. The cache ram 28 is preferably suitable high-speed static random access memory which interfaces with the address and data elements of bus 26 under control of the cache controller 24 to carry out required cache memory operations. The cache controller 24 is preferably an Intel 82385 cache controller configured to operate in two-way set associative master mode. In the preferred embodiment the components are the 33 MHz versions of the respective units. Address latch circuitry 34 and data transceiver 36 interface the cache controller 24 with the processor 20 and provide a local bus interface between the local processor bus 26 and a host bus 44.

Circuit 38 is a logic circuit which provides a bus ready signal to control access to the local bus 26 and indicate when the next cycle can begin. The enable circuit 40 is utilized to indicate that the next address of data or code to be utilized by subsystem elements in pipelined address mode can be placed on the local bus 26.

Noncacheable memory address map programmer 30 cooperates with the processor 20 and the noncacheable address memory 32 to map noncacheable memory locations. The noncacheable address memory 32 is utilized to designate areas of system memory that are noncacheable to avoid many types of cache memory incoherency. The bus request logic circuit 42 is utilized by the processor 20 and associated elements to request access to the host bus 44 in situations such as when requested data is not located in the cache memory 28 and access to system memory is required.

In the drawings, system C is configured having the processor bus 26, the host bus 44, an extended industry standard architecture (EISA) bus 46 (FIG. 2A and FIG. 2B) and an X bus 90. The details of the portion of the system illustrated in FIG. 2A and FIG. 2B, and not discussed in detail below are not significant to the present invention other than to illustrate an example of a fully configured computer system. The EISA specification Version 3.1 is provided in U.S. Pat. No. 5,101,492 filed Sep. 3, 1989, issued Mar. 31, 1992, and entitled "Data Redundancy and Recovery Protection" by Schultz, et al., and fully explains the requirements of an EISA system and is hereby incorporated by reference. The portion of system C illustrated in FIG. 2A and FIG. 2B is essentially a configured EISA system which includes the necessary EISA bus 46, and EISA bus controller 48, data latches and transceivers 50 and address latches and buffers 52 to interface between the EISA bus 46 and the host bus 44. Also illustrated in FIG. 2A and FIG. 2B is an integrated system peripheral 54, which incorporates a number of the elements used in an EISA-based computer system.

The integrated system peripheral (ISP) 54 includes a direct memory access controller 56 for controlling access to main memory 58 (FIG. 1) or memory contained in EISA slots and input/output (I/O) locations without the need for access to the processor 20. The main memory array 58 is considered to be local memory and comprises a memory circuit array of size suitable to accommodate the particular requirements of the system. The ISP 54 also includes interrupt controllers 70, nonmaskable interrupt logic 72 and system timers 74 which allow control of interrupt signals and generate necessary timing signals and wait states in a manner according to the EISA specification and conventional practice. In the preferred embodiment, processor generated interrupt requests are controlled via dual interrupt control circuits emulating and extending conventional Intel 8259 interrupt controllers. The ISP 54 also includes bus arbitration logic 75 which, in cooperation with the bus controller 48, controls and arbitrates among the various requests for the EISA bus 46 by the cache controller 24, the DMA controller 56 and bus master devices located on the EISA bus 46.

The main memory array 58 is preferably dynamic random access memory. Memory 58 interfaces with the host bus 44 via a data buffer circuit 60, a memory controller circuit 62 and a memory mapper 68. The buffer 60 performs data transceiving and parity generating and checking functions. The memory controller 62 and memory mapper 68 interface with the memory 58 via address multiplexer and column address strobe buffers 66 and row address enable logic circuit 64.

The EISA bus 46 includes ISA and EISA control buses 76 and 78, ISA and EISA control buses 80 and 82 and address buses 84, 86 and 88. System peripherals are interfaced via the X bus 90 in combination with the ISA control bus 76 from the EISA bus 46. Control and data/address transfer for the X bus 90 are facilitated by X bus control logic 92, data transceivers 94 and address latches 96.

Attached to the X bus 90 are various peripheral devices such as keyboard/mouse controller 98 which interfaces the X bus 90 with a suitable keyboard and mouse via connectors 100 and 102, respectively. Also attached to the X bus 90 are read only memory circuits 106 which contain basic operations software for the system C and for system video operations. A serial communications port 108 is also connected to the system C via the X bus 90. Floppy and fixed disk support, a parallel port 112 generally used to communicate with the printer 114, a second serial port, and video support circuits are provided in block circuit 110.

Figure 3:
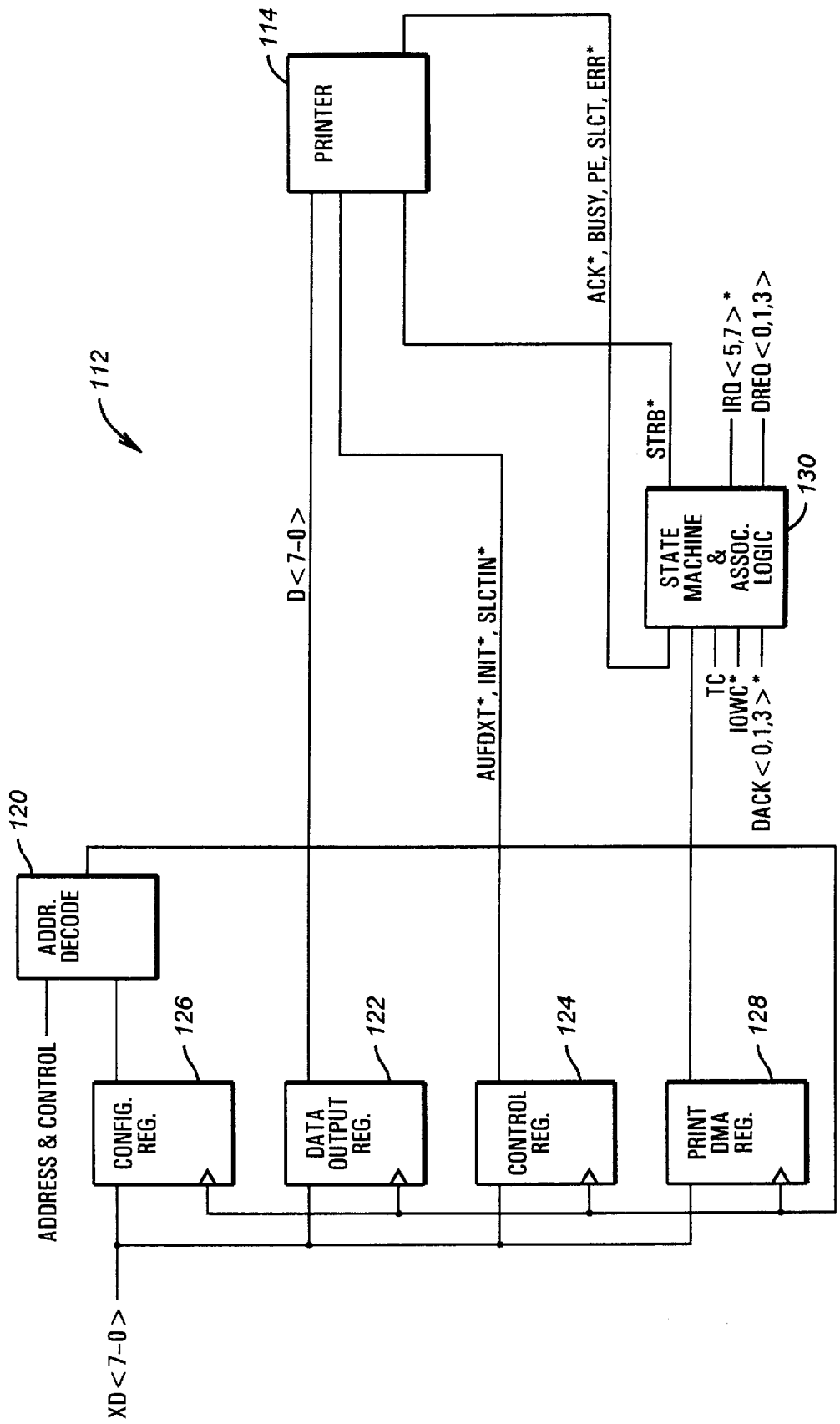
FIG. 3 is a more detailed schematic block diagram of circuitry incorporating the present invention.

The parallel port 112 is shown in more detail in FIG. 3. The parallel port 112 includes address decode circuitry 120 which decodes the various addresses provided on the X bus 90 for addresses associated with the particular printer port selected or selected control registers. In the preferred embodiment the printer port I/O port address blocks are 3BC–3BF for LPT1, 378-37B for LPT2, and 278-27B for LPT3, these being the conventional hexadecimal addresses according to the standards developed for IBM PC compatible personal computers. The preferred addresses of the various control registers will be noted with the register description.

A data output register 122 is connected to the data bus XD 129 to receive the lower 8 bits of data and is connected to the address decode circuitry 120 to properly clock in the data. This data output register 122 is that commonly associated with the parallel port at the base or zero bias address of the particular address block. A control register 124 is also connected to the data bus XD 130 and receives a clocking signal from the address decode circuitry 120, preferably at the second address of the particular address block, to provide the auto linefeed, initialize printer and select in signals associated with the printer 114 in the conventional interface. A configuration register 126, preferably located at I/O port address 0C65, is provided to allow selection of the particular parallel port address block to be associated with the parallel port 112 and the interrupt to be utilized by the port. Preferably interrupts IRQ5 or IRQ7 are utilized, with the defaults for the port being LPT1 and IRQ7.

An additional register referred to as the printer DMA register 128 is provided in a computer system incorporating the present invention to allow control of the direct memory access parallel port option. The printer DMA register 128 is also connected to the data bus XD 129 and to the address decode circuitry 120. This register 128 is preferably located at I/O port address 0C7B and is a read/write port. Preferably 3 bits are allocated for determining the desired DMA channel and 1 bit is provided to enable or disable parallel port DMA operation and to indicate status in the cycle of the circuitry. A state machine and associated logic circuitry 130 is provided to control operation so that the appropriate signals are produced to the printer 114, the interrupt controller 70 and the DMA controller 56 based on the signals provided from the DMA controller 56, the printer 114 and the printer DMA register 128. Details of the state machine and associated logic 130 will be explained in greater detail.

Figure 4:
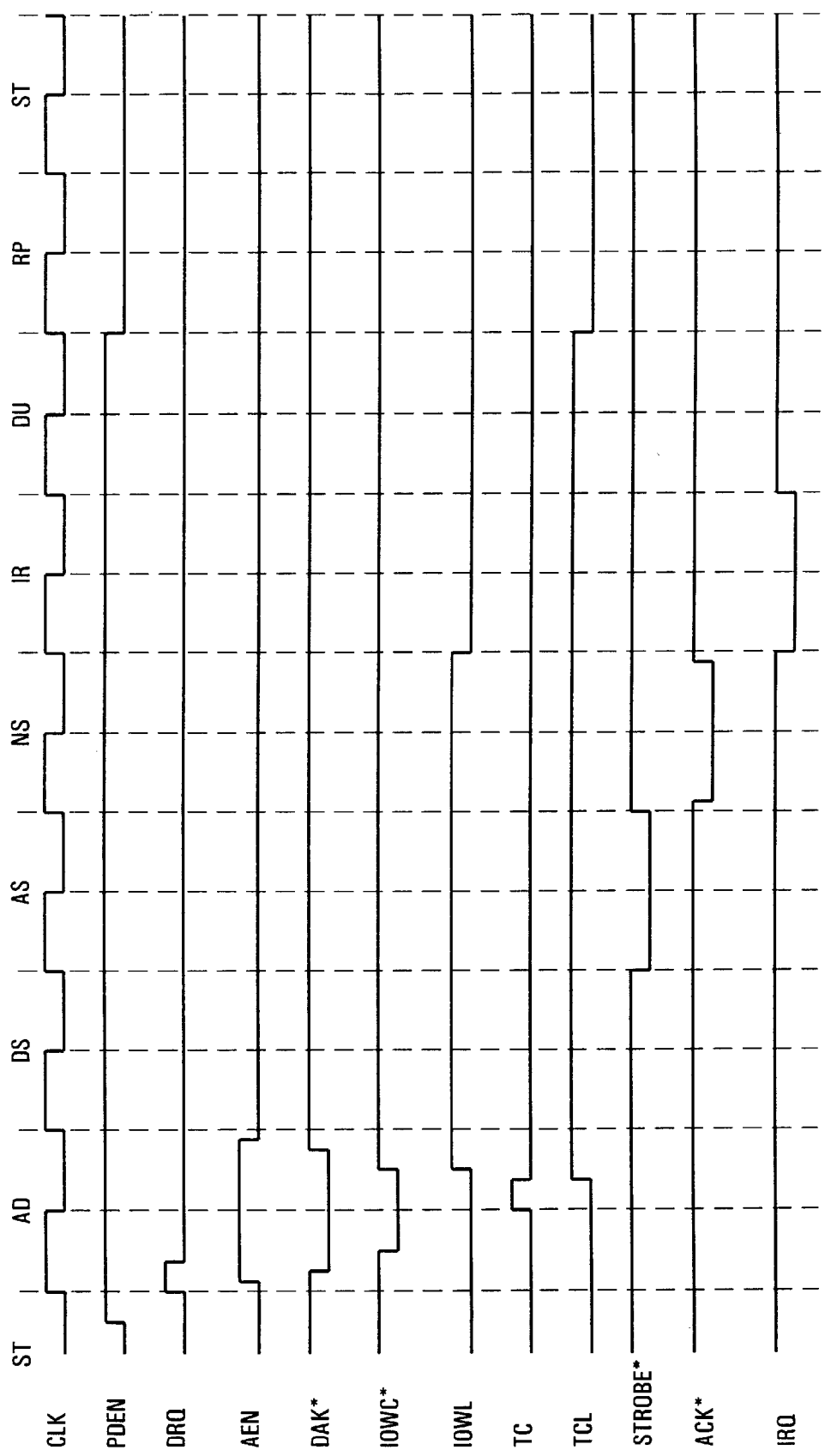
FIGS. 4 and 5 are timing diagrams for various signals utilized in operation of the present invention.

Referring now to FIG. 4, a timing diagram is provided illustrating the operation of a single cycle or transfer of a single byte of data from memory to the printer 114. The basic clocking signal for the operation is the CLK signal, which is preferably a signal having frequency less than 2 MHz, 1.8432 MHz in the preferred embodiment. This frequency limit is preferred because the STROBE* signal presented to the printer 114 must be at least 500 nsec long according to the general specifications and therefore the use of a 2 MHz or lower clock frequency readily provides this pulse width. The CLK signal is used to clock the state machine through of the various states, which are indicated above the particular clock phase in FIG. 4. The parallel port DMA enable signal, referred to as PDEN, is used to trigger the operation. When the PDEN signal goes high this is an indication that data is to be transferred to the parallel port under the control of the DMA controller 56. Then on the next rising edge of the CLK signal the DRQ or DMA request signal for the selected DMA channel is raised to indicate to the DMA controller 56 that a DMA request is desired and information should be passed. The DMA controller 56 acknowledges the request by gaining control of the bus and raising the AEN signal, to indicate that a memory address is being presented in the address bus and that any I/O devices except the acknowledged DMA device are to ignore the address. Additionally, the DMA controller 56 lowers the appropriate DAK* or DMA acknowledge signal to indicate that the DMA request is acknowledged. Upon seeing this acknowledgement of its DMA request, the circuitry 130 lowers the DREQ line so that only a single byte is transferred. The DMA controller 56 then proceeds along its course and produces the IOWC* signal, which indicates that data is being read from the memory and is to be written to the I/O port location requesting the information at this time. Additionally, the DMA controller 56 indicates that this is the last or terminal count byte to be transferred in the particular case of FIG. 4 by setting the TC signal high. on the falling edge of the TC signal a signal referred to as TCL is provided high to indicate to the circuitry 130 that a terminal count has been reached. On the rising edge of the IOWC* signal, a signal referred to as IOWL is asserted or made high to indicate to the circuitry 130 that data has been presented to the circuitry 130 for presentation to the printer 114.

The circuitry 130 proceeds through several states of the state machine until it reaches state A5, at which time the STROBE* signal goes low to indicate to the printer 114 that data is present on the data lines. On the next rising edge of the CLK signal the STROBE* signal is raised, thus strobing the data into the printer 114. The printer 114 responds by lowering the ACK* signal to acknowledge the receipt of the data. On the next rising edge of the CLK signal following the receipt of the ACK* signal, the IOWL signal is lowered, thus clearing the indication to the circuitry 130 of a need to transfer data. Also at this time the IRQ or interrupt request signal goes low to indicate that the desired data transfer has been completed, and therefore the printer operation is complete. The IRQ signal is held low for one CLK cycle. On the next rising edge of the CLK signal the TCL signal is lowered, thus clearing the terminal count indication in the circuitry 130. At this time the state machine automatically lowers the PDEN signal to indicate completion of the cycle and to allow another cycle to be initiated. The state machine then proceeds to a resting state ST.

Figure 5:
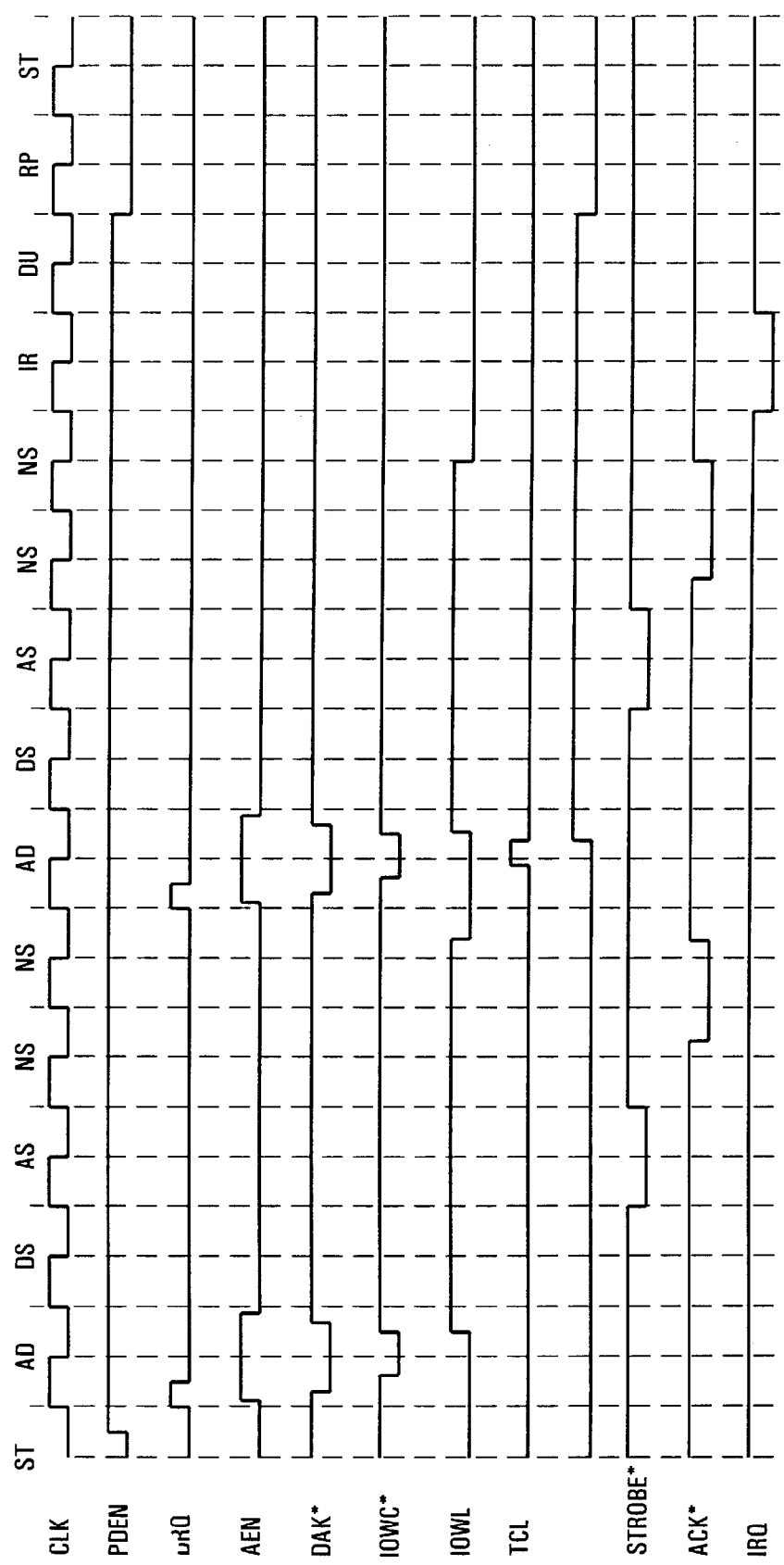

FIG. 5 shows a condition where 2 bytes of data are passed from to the printer 114 by the DMA controller. The PDEN signal undergoes a rising edge to initiate the process. The DREQ signal is then asserted to indicate the request to transfer a byte of data to the printer 114. The DAK* and IOWC* signals are then asserted by the DMA controller 56 and the data is transferred to the circuitry 130. The STROBE* signal is produced as before to strobe the data into the printer 114. In this case however the printer 114 is slightly slower in responding and the ACK* signal does not return to a high level until after the next rising edge of the CLK signal following the removal of the STROBE* signal, thus holding the IOWL signal high past a CLK signal rising edge. This is considered a wait state condition in relation to the state machine and therefore an additional CLK cycle is used in transferring the data. When the ACK* signal is raised the IOWL signal goes low, while the TCL signal remains low and the PDEN signal remains high, indicating that more information is to be transferred. Thus the DREQ signal is reasserted to indicate to the DMA controller that a second byte of data should be transferred. This then initiates a second cycle transferring the second byte, with the timing of this particular transfer being similar to the timing in FIG. 4, in that it is a terminal transfer and the TC signal is raised by the DMA controller 56.

Figure 6:
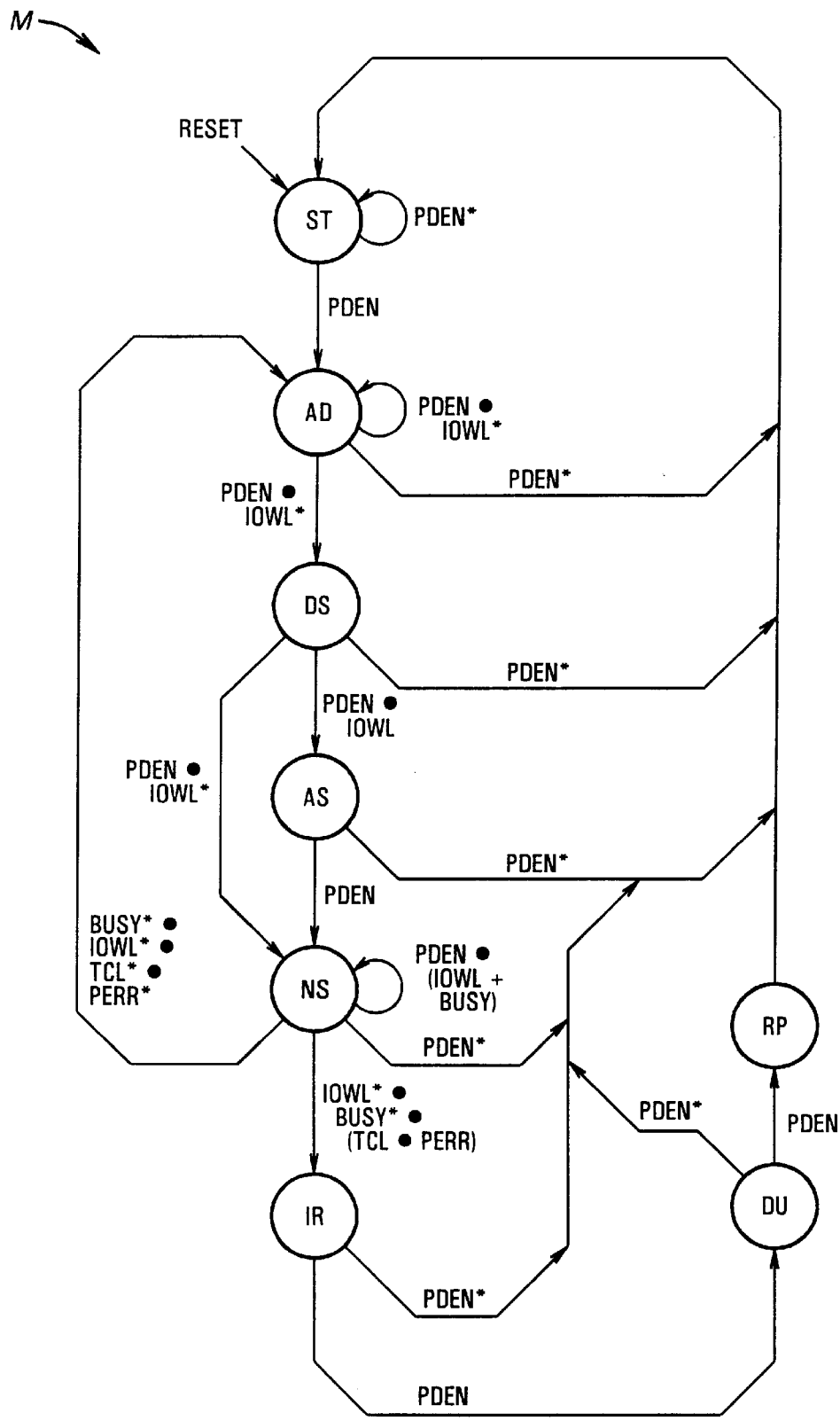
FIG. 6 is a state machine diagram of operating sequences of portions of the circuitry of FIG. 3.

As indicated, a state machine M (FIG. 6) controls operation of the circuitry 130. Upon reset of the computer system C the state machine M starts in state ST, referred to as the start or reset state. The state machine M stays in state ST while the PDEN signal is low, indicating that the printer DMA transfer has not been enabled. When the PDEN signal goes high, indicating that a transfer is desired, control proceeds on the next rising edge of the CLK signal to state AD, the accept data state. Control remains in state AD while the PDEN signal is high and the IOWL* signal is high, indicating that the IOWC* signal strobe has not been completed. This condition is possible because the memory devices responding to the request may be slow and thus need wait states. If the PDEN signal goes low, indicating that a request is not necessary, control transfers from state AD to state ST. If however, the PDEN signal is high and the IOWL signal goes high, indicating that the data has been transferred from the memory into the data output register 122, control proceeds to state DS on the rising edge of the CLK signal. The IOWL signal thus indicates that data is present and needs to be transferred from the circuitry 130.

From state DS, the data setup state, control proceeds to state ST if the PDEN signal is the lowered. If for some reason the IOWL signal should be removed while the parallel DMA function is enabled, control proceeds to state DS to state NS, the negate strobe state. In this case it is noted that no STROBE* signal is provided to the printer 114. Under normal conditions the PDEN signal is high and the IOWL signal is high, so control proceeds from state DS to state AS, the assert strobe state. If the PDEN* signal should be low at the next rising edge of the CLK signal, control proceeds to state ST. If the PDEN signal remains high, then control proceeds to state NS. Control remains in state NS until the printer has responded to the data that has been strobed. This is indicated by the PDEN signal being high and either the IOWL signal being high, which indicates an acknowledgement has not been completed, or the BUSY signal, which is received from the printer 114 to indicate that it is busy, being high. If the PDEN signal should be removed, control returns to state ST. When the printer 114 acknowledges that it has received the information so that the IOWL signal goes low and the BUSY signal goes low, then control proceeds from state NS. If this was not the last byte to be transferred and no printer errors were received, then control proceeds from state NS to state AD to receive the next byte of data. If, however, this was the last byte of data to be transferred or a printer error occurred, when the printer 114 acknowledges completion of the particular byte transfer, control proceeds from state NS to state IR, the interrupt request state. Control proceeds from state IR to state ST if the PDEN signal goes low and proceeds to state DU, a dummy state, if the PDEN signal remains high, indicating that the operation is to continue. From state DU control proceeds to state ST if the PDEN signal is removed or to state RP if the PDEN signal is still asserted. In state RP, the reset state, the PDEN signal is cleared and control proceeds to state ST in all cases. The exact details of the construction of the state machine M are not shown as this is considered to be within the level of those skilled in the art.

Figure 7:
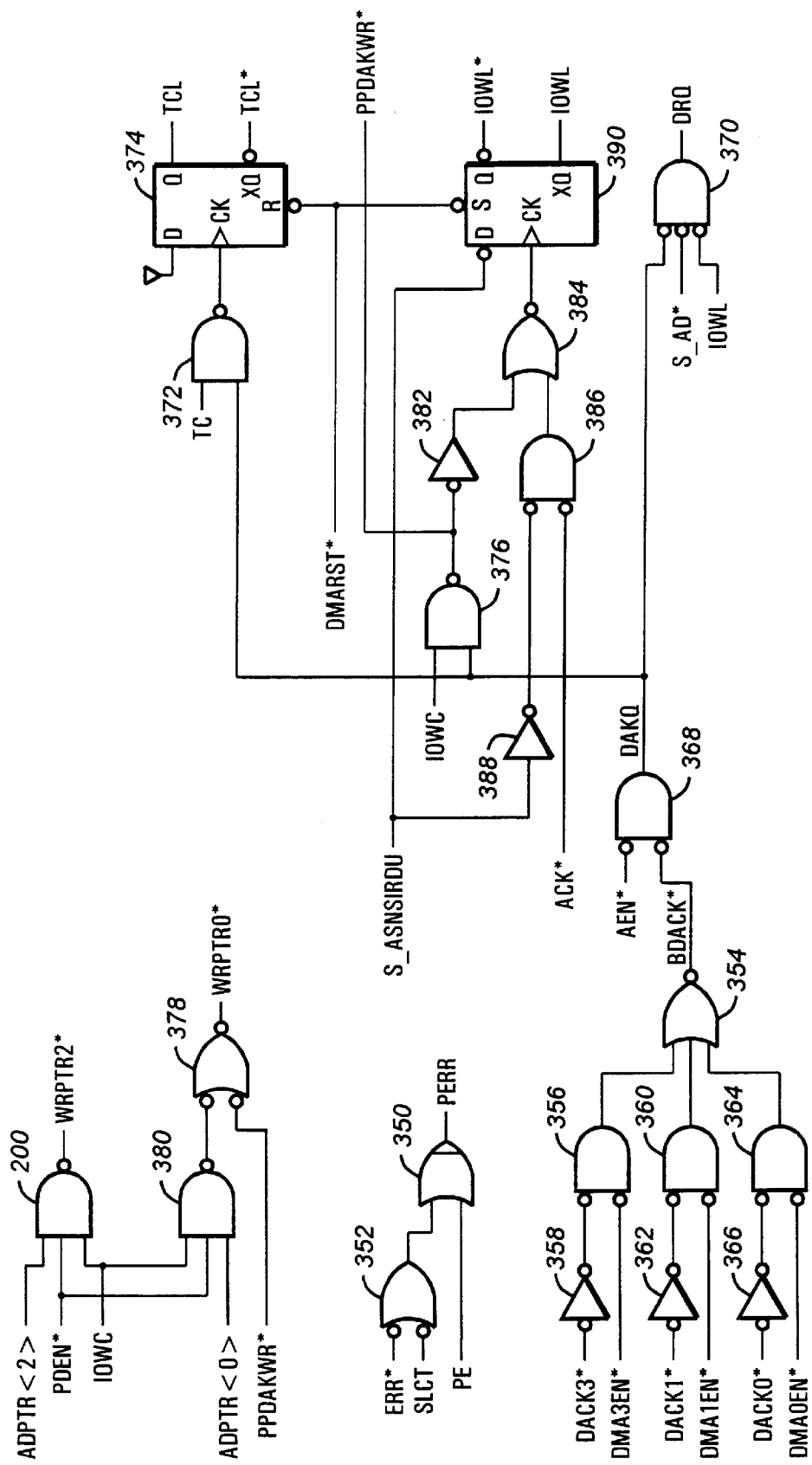
FIGS. 7, 8 and 9 are detailed schematic diagrams of circuitry associated with the state machine of FIG. 6 and with the block diagram of FIG. 3.
Figure 9:
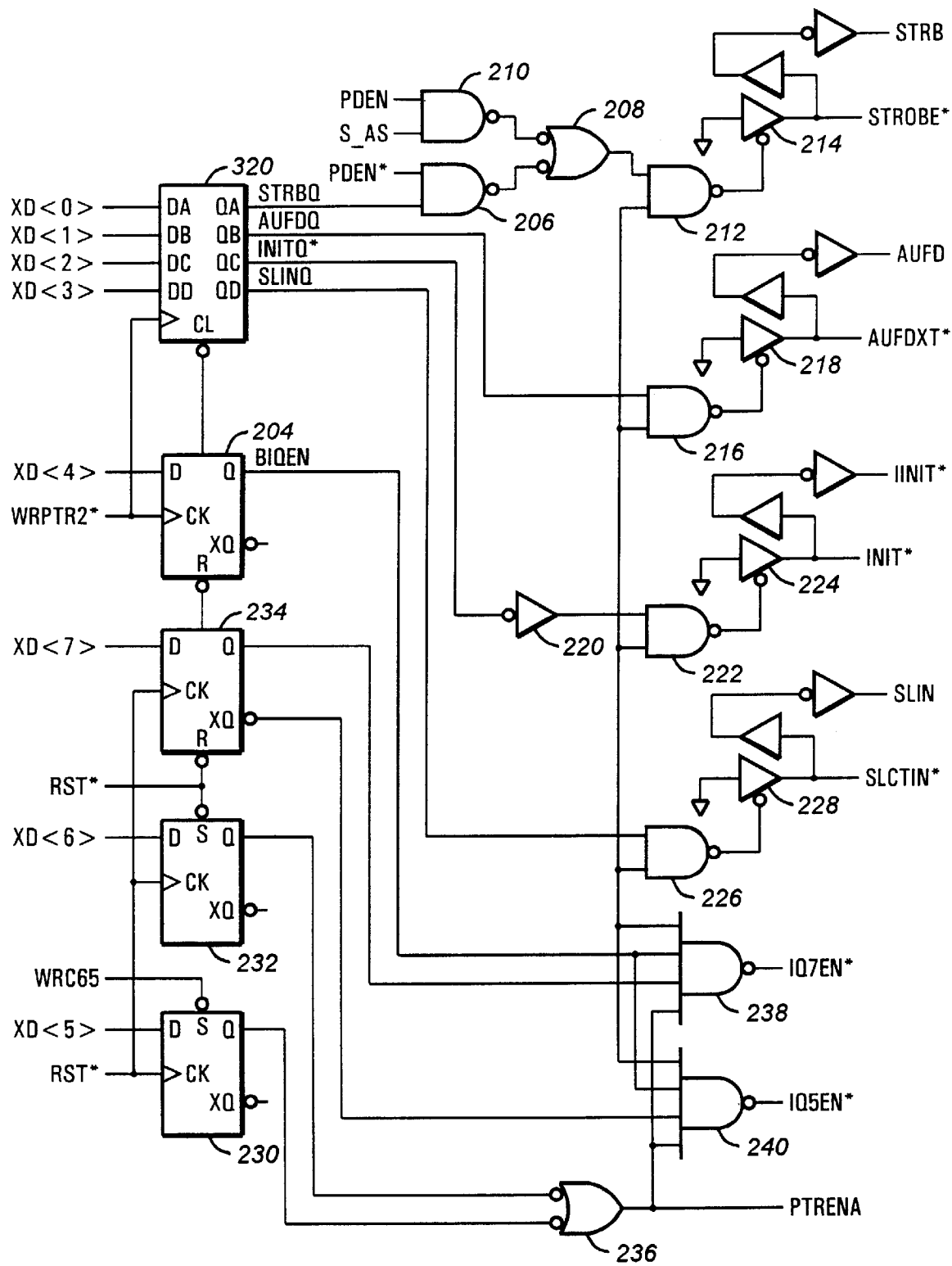

Referring now to FIG. 7, various associated logic circuitry is necessary in combination with the state machine M to perform the functions of the circuitry 130. When the parallel port DMA function is enabled, it is preferably desired that the processor 20 cannot directly access the parallel control port or the parallel data port, thus interfering with the DMA controller-based print function. To this end a three input NAND gate 200 receives inputs of the IOWC signal, to indicate that a address strobe is present; the PDEN* signal, which indicates the status of the printer DMA function; and the ADPTR<2> signal, which is an address decode signal indicating that an I/O operation is being requested at the parallel control port location. Thus when the PDEN signal is high, indicating that the printer DMA function is enabled, the write pulse to the parallel control port from the processor 20 is disabled. The output of the NAND gate 200 is the WRPTR2* signal which is provided as a clocking input to a 4 bit D-type flip-flop 202 (FIG. 9) and a single bit D-type flip-flop 204. These two flip-flops 202 and 204 comprise the control register 124 and are appropriately connected to the XD data bus 129 to receive the bit positions designated to control the strobe output, the auto linefeed output, the initialize output, the select output, and the interrupt enable output.

The bit 0 position corresponds to the strobe output of the flip-flop 202, which is presented to one input of a two input NAND gate 206. The other input of the NAND gate 206 is the PDEN* signal, so that the output of the NAND gate 206 is disabled if the printer DMA function is enabled. The output of the NAND gate 206 is provided to one input of a two input NAND gate 208, whose other input is received from the output of a two input NAND gate 210. The inputs to the two input NAND gate 210 are the PDEN signal and a signal referred to as S_AS, which indicates that the state machine M is in state AS, the address strobe state. The output of NAND gate 208 is provided as one input to a two input NAND gate 212, whose output is connected to the inverted tri-state control input of an output buffer 214. The input to the buffer 214 is connected to ground and the output is the STROBE* signal provided to the printer 114. The second input to the NAND gate 212 is a signal referred to as TS_OUT*, which allows the parallel outputs to be disabled if desired.

The bit 1 position of the XD data bus 129 corresponds to the auto linefeed signal. This particular output of the flip-flop 202 is connected to one input of a two input NAND gate 216, whose other input receives the TS_OUT* signal. The output of the NAND gate 216 is connected to the inverted tri-state control input of a buffer 218, whose input is connected to ground and whose output represents the AUFDXT* or auto linefeed signal.

The bit 2 position of the data bus corresponds to the initialize printer signal and the appropriate output of the flip-flop 202 is presented to an inverter 220 whose output is connected to one input of a NAND gate 222, whose other input receives the TS_OUT* signal. The output of the NAND gate 222 is connected to the inverted tri-state control input of a buffer 224, whose input is grounded and whose output is the INIT* signal to cause the printer 114 to be initialized.

The bit 3 position of the data bus corresponds to the select line provided to the printer and the output of the flip-flop 202 is provided to one input of a NAND gate 226, whose other input receives the TS_OUT* signal. The output of the NAND gate 226 is provided to the inverted tri-state control input of a buffer 228, whose input is grounded. The output of buffer 228 is the SLCTIN* signal, which when asserted low, indicates that the printer 114 is selected.

The parallel configuration register 126 is preferably located at address 0C65 and contains 2 bits to select the desired parallel port address block to be utilized and 1 bit to determine which interrupt is to be used, as previously mentioned. If the 2 bits utilized to select the parallel port address block are both in a high state, this is an indication that the parallel port is disabled in the preferred embodiment. A signal referred to as WRC65, which indicates a write strobe to I/O port 0C65, the preferred I/O port address of the parallel control register 126, is provided to the clocking inputs of 3 D-type flip-flops 230, 232 and 234. The D inputs of the flip-flops 230 and 232 are connected respectively to bits 5 and 6 of the data bus XD 130 and are used to select the parallel port address block to be utilized. The noninverted outputs of the flip-flops 230 and 232 are connected as the two inputs to a two input NAND gate 236, whose output is the PTRENA or printer enable signal. The D input to the flip-flop 234 is connected to bit position 7 of the XD data bus 130 and is used to indicate which interrupt line is to be utilized. The noninverted output of the flip-flop 234 is provided as one input to a 4 input NAND gate 238, whose other inputs are the TS_OUT* signal, the signal present at the noninverting output of the flip-flop 204, which indicates that the interrupts are enabled, and the PTRENA signal, which indicates that the printer 114 is enabled. The output of the NAND gate 238 is the IQ7EN* signal which, when asserted low, indicates that IRQ7 is to be utilized. The inverted output of the flip-flop 234 is provided along with the BIQEN signal provided as the output of flip-flop 204, the TS_OUT* signal and the PTRENA signal to a four input NAND gate 240, whose output is the IQ5EN* signal which indicates, when low, that IRQ5 is to be utilized for the parallel port.

Figure 8:
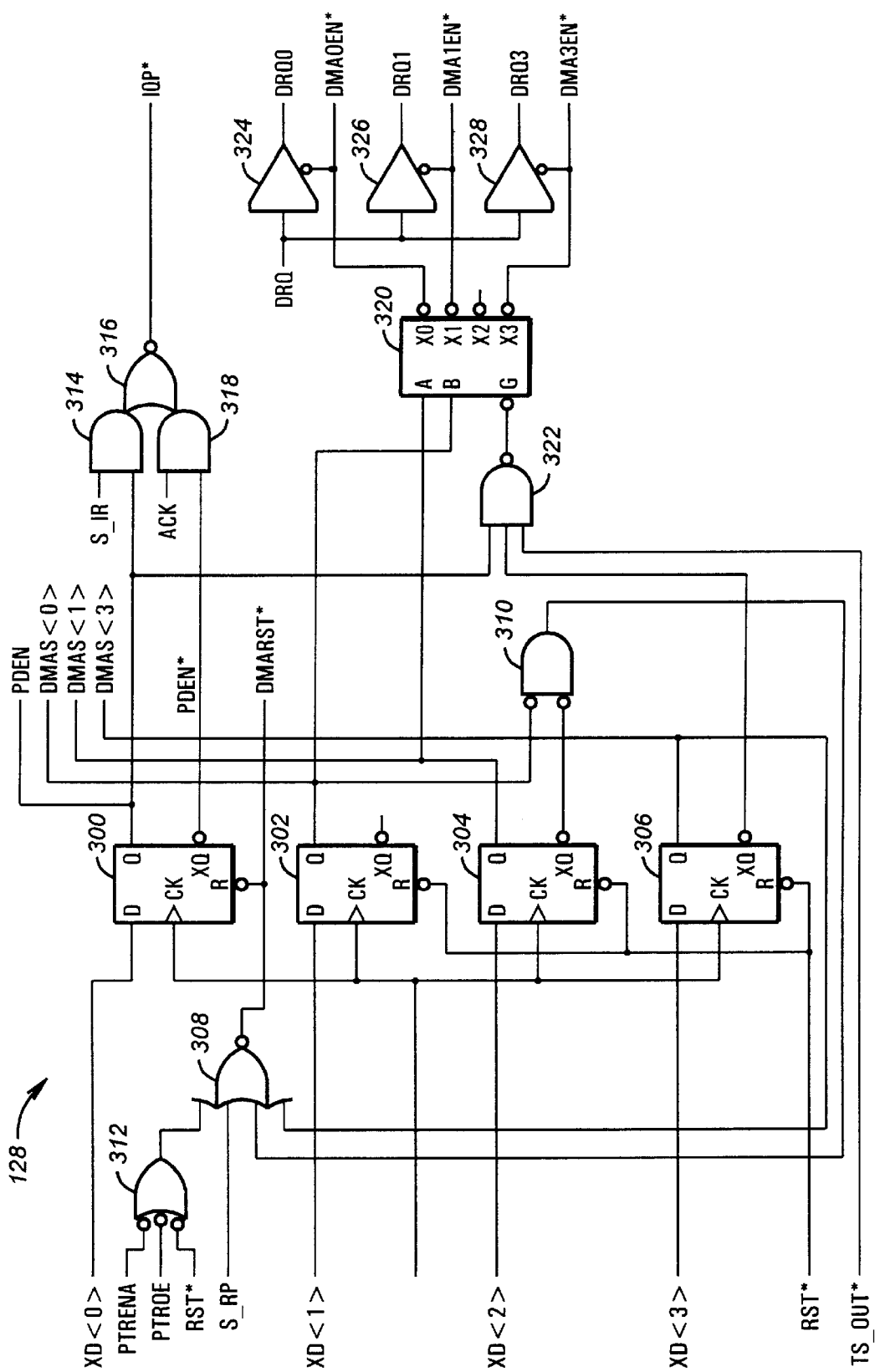

The printer DMA register 128 is shown in FIG. 8. This register 128 has an address of 0C7B in the preferred embodiment. A clocking strobe referred to as WRXC7B* is provided to the clocking inputs of four D-type flip-flops 300, 302, 304 and 306, which form the 4 bits of the register 128. The inverted reset inputs of the flip-flops 302, 304 and 306 are connected to the RST* signal, which is a signal that indicates that the computer system C is being reset. Bit positions 1, 2 and 3 of the data bus XD are connected respectively to the D inputs of the flip-flops 302, 304 and 306 to indicate which DMA channel is selected. The non inverted output of the flip-flop 302 is the DMAS<0> signal, the noninverted output of the flip-flop 304 is the DMAS<1> signal and the noninverted output of the flip-flop 306 is the DMAS<2> signal. These three signals are the encoded value of the particular DMA channel to be utilized. While 3 bits are provided for DMA channel selection, in the preferred embodiment only 3 of the 8 possible channels can be utilized to prevent interference with other devices which utilize the DMA controller 56. The allowed channels in the preferred embodiment are DMA channels 0, 1 and 3. If the register 136 is programmed to utilize channels 2 or 4–7, then the printer DMA function is automatically disabled. This is provided by connecting the noninverted output of the flip-flop 306 to one input of a four input NOR gate 308, whose output is connected to the inverted reset input of the flip-flop 300, whose noninverted output is the PDEN signal. Additionally, the noninverted output of the flip-flop 302 and the inverted output of the flip-flop 304 are provided as the two inputs to a two input NOR gate 310, whose output is also one of the inputs to the NOR gate 308. A third input to the NOR gate 308 is the S_RP signal, which indicates that the state machine M is in state RP, the reset state. The fourth input to the NOR gate 308 is provided by the output of a three input NAND gate 312, whose inputs are the PTRENA signal, the PTROE signal, which indicates that the printer output function is enabled, and the RST* signal. The output of the NOR gate 308 is referred to as the DMARST* signal to indicate it is for resetting of the printer DMA function. The 0 bit position of the XD data bus 130 is connected to the D input of the flip-flop 300 to allow the computer C to turn on or enable the printer DMA function. Additionally, the four outputs of the flip-flops 300, 302, 304 and 306 are provided to the data bus XD 130 through circuitry (not shown) allowing the computer system C to read the particular values present in the register 128, thus making this a full read/write register.

The PDEN signal is provided as one input to a two input AND gate 314, whose other input is the S_IR signal, which indicates that the state machine M is in state IR. This AND gate 314 is used to provide the IRQ pulse to the proper interrupt request line when the printer DMA function is enabled. The output of the AND gate 314 is connected to one input of a two input NOR gate 316, whose output is the IQP* signal. The other input of the NOR gate 316 is connected to the output of a two input AND gate 318, whose inputs receive the PDEN* signal and the ACK signal. This AND gate 318 is utilized when the printer DMA function is not enabled so that an interrupt is generated whenever the printer 114 acknowledges the receipt of the data.

Selection of the particular DMA channel which is to receive the DMA request signal is provided by the use of a 2–44 decoder 320. The noninverted outputs of the flip-flop 302 and the flip-flop 304 are provided to the selection inputs of the decoder 320, while the output of a three input NAND gate 322 is provided to the inverted enable input of the decoder 320. The three inputs to the NAND gate 322 are the PDEN signal, the inverted output of the flip-flop 306 and the TS_OUT* signal. Thus the DMA request function is disabled when either the printer DMA function is disabled, the outputs are tristated or one of the upper four DMA channels are selected. The decoder 320 produces a low signal based on the binary encoded value of the two input signals, so that the 0 output corresponds to a requested DMA channel 0, this being the DMA0EN* signal, which is connected to the inverted tristate control input of a buffer 324, whose input is the DRQ signal and whose output is the DRQ0 signal. The output of the 1 position of the decoder 320 is the DMA1EN* signal and is provided to the inverted tristate control input of a buffer 326, whose input receives the DRQ signal and whose output is the DRQ1 signal. Similarly, the bit 3 position of the decoder 320 is the DMA3EN* signal and is provided to the inverted tristate control input of a buffer 328 whose input receives the DRQ signal and whose output is the DRQ3 signal. DRQ0, DRQ1 and DRQ3 outputs are thus provided to the XD bus 90 as appropriate to allow the DMA controller 56 to be alerted.

As noted while discussing the state machine M the state machine M branches according to certain signals. One of these signals is the PERR or printer error signal, which is produced as the output of a two input OR gate 350 (FIG. 7) one of whose inputs is the PE signal, which is the paper end signal from the printer 114, and whose other input is the output of a two input NAND gate 352, which receives the ERR* signal, which indicates that there has been a printer error, and the SLCT signal, which indicates that the printer 114 is selected. Thus when either the printer 114 is out of paper, there is a printer error or the printer 114 has been deselected, the PERR signal goes high to indicate this error condition.

Various logic is also necessary to receive the various DMA acknowledge signals. A signal referred to as BDACK*, a buffered DMA acknowledge signal, is produced as an output of a three input NOR gate 354. One of the inputs of the NOR gate 354 is the output of a two input NOR gate 356 whose inputs are the DMA3EN* signal and the output of a buffer 358 which is connected to the DACK3* signal provided on the X bus 90. A second input to the NOR gate 354 is provided by the output of a two input NOR gate 358, one of whose input signals is the DMA1EN* signal and whose other input is received from a buffer 362 whose input is the DACK1* signal. Similarly, the third input of the NOR gate 354 is provided by the output of a two input NOR gate 364, one of whose inputs is the DMA0EN* signal and whose other input is provided by the output of a buffer 366, which is connected to the DACK0* signal. Thus the BDACK* signal indicates the presence of a DMA acknowledge on the appropriate DMA channel as selected by the printer DMA control register.

The BDACK* signal is provided as a one input to a two input NOR gate 368 whose other input receives the AEN* signal. The output of the NOR gate 368 is the DAKQ signal, which indicates that a valid DMA acknowledge has been received. This output signal is provided as one input to a three input NOR gate 370 whose other inputs are the IOWL signal and the S_AD* signal, which indicates that the state machine M is not in state AD. The output of the NOR gate 370 is the DRQ signal which is provided to the buffers 324, 326 and 328 for presentation to the X bus 90. Thus the DRQ signal is presented whenever the state machine enters state AD, a DMA acknowledgement on the particular channel is not present and the IOWL signal is not active.

The DAKQ signal is also provided as one input to a two input NAND gate 372 whose other input is the TC signal from the X bus 90. The output of NAND gate 372 is provided as the clocking input to a D-type flip-flop 374, whose D input is connected to a high logic level and whose output is the TCL signal. The inverted reset input to the flip-flop 374 is connected to the DMARST* signal. Thus whenever a proper DMA cycle is in progress, as indicated by DAKQ signal and the TC signal is received, then on the following edge of the TC signal the TCL signal is generated. The TCL signal is cleared when the state machine reaches the reset state RP.

The DAKQ signal is also provided as one input to a two input NAND gate 376, whose other input is the IOWC signal. The output of the NAND gate 376 is referred to as the PPDAKWR* signal, that is, the parallel port DMA acknowledge write strobe, to indicate that data is to be clocked into the parallel port data output register 122. The signal is provided as one input to a two input AND gate 378, whose other input is connected to the output of a three input NAND gate 380. The inputs of the NAND gate 380 are the PDEN* signal, the IOWC singal and the ADPTR<0> signal, which is the address decode to indicate that the parallel port data output register 122 is being addressed by the computer. Thus the output of the NAND gate 380 is disabled when the parallel DMA function is activated and in those cases the data output register 122 clocking strobe is provided by the PPDAKWR* signal through the AND gate 378.

The PPDAKWR* signal is also provided to an inverter 382, whose output is connected to one input of a two input NOR gate 384. The other input of the NOR gate 384 is provided by the output of a two input NOR gate 386, one of whose inputs is the ACK* signal and the other is the output of an inverter 388. The input to the inverter 388 is a signal which indicates that the state machine is in one of the states AS, NS, IR or DU. The S_ASNSIRDU signal is also provided to the inverted D input of a D-type flip-flop 390. The output of the NOR gate 384 is provided to the clocking input of the flip-flop 390, while the DMARST* signal is provided to the inverted set input of the flip-flop. The inverted output of the flip-flop 390 is the IOWL* signal, while the noninverted output of the flip-flop 390 is the IOWL signal. Thus the IOWL signal is developed on the rising edge of the IOWC* strobe when a printer DMA cycle is in progress and is cleared either when state machine M enters state RP or when the printer acknowledges the receipt of data, generally in state NS.

The parallel port or printer DMA function is operated using only a few steps which use a minimal amount of the processor's time. The data to be printed is located in a continuous location in memory. This can be as a result of the user's program or after placement by a function call. The starting address and number of bytes to be transferred is known. The desired channel of the DMA controller 56 is set up for a demand mode transfer with the initial memory address and byte count loaded into the DMA controller 56. The appropriate DMA channel is set in the printer DMA register 128. A one value is written to the PDEN flip-flop 300 in the printer DMA register 128 and the transfer sequence commences. When the transfer is completed the processor 20 is interrupted and any necessary completion tasks are performed. Thus large data blocks can be printed without processor control of each byte, increasing overall efficiency of the computer system C.

The foregoing disclosure and description of the invention are illustrative and explanatory thereof, and various changes in the size, shape, materials, components, circuitry, wiring connections and contacts, as well as in the details of the illustrated circuitry, construction and method of operation may be made without departing from the spirit of the invention.

What is claimed is:

1. A computer system for communicating with an external device in a parallel format, comprising:

a microprocessor;

a peripheral storage device coupled to the microprocessor for storing data;

a memory coupled to said microprocessor for storing instructions and data for said microprocessor and data to be communicated to the external device;

a direct memory access controller coupled to said memory for controlling the transfer of data from said memory; and a parallel output port coupled to said memory and said direct memory access controller for receiving a plurality of data packets from said memory under control of said direct memory access controller and for providing said data packets to the external device, said parallel output port further including a circuit for developing a signal for use by the external device to indicate that each data packet is available, and a circuit for receiving a signal from the external device that each data packet has been accepted.

2. The computer system of claim 1, wherein said parallel output port includes a circuit for receiving a signal from the external device that an error has occurred.

3. The computer system of claim 1, wherein said parallel output port includes a circuit for indicating to said direct memory access controller to initiate the transfer of data from said memory to said parallel output port.

4. The computer system of claim 3, wherein said direct memory access controller indicates to said parallel output port that the data transfer has been completed and where said parallel output port is coupled to said microprocessor, said parallel output port including a circuit for indicating to said microprocessor that said data transfer is completed.

5. The computer system of claim 4, wherein said parallel output port data transfer complete indicating circuit interrupts said microprocessor operation.

6. The computer system of claim 1, wherein said parallel output port is coupled to said microprocessor other than by said direct memory access controller and wherein said parallel output port includes a circuit for receiving data from said microprocessor and for providing said data to the external device.

7. The computer system of claim 6, wherein said parallel output port for receiving data from said microprocessor is disabled when said parallel output port is receiving data under control of said direct memory access controller.

8. The computer system of claim 1, wherein said parallel output port is coupled to said microprocessor and said parallel output port includes a circuit controllable by said microprocessor to initiate receipt of data by said parallel output port under control of said direct memory access controller.

9. The computer system of claim 1, wherein said direct memory access controller includes a plurality of channels and said parallel output port includes a selector circuit for selecting the channel of said direct memory access controller to be used by said parallel output port.

10. The computer system of claim 1, wherein said parallel output port can reside at a plurality of address locations.

11. A computer system for communicating with an external device in a parallel format, comprising:

a microprocessor;

a peripheral storage device coupled to the microprocessor for storing data;

a memory means coupled to said microprocessor for storing instructions and data for said microprocessor and data to be communicated to the external device;

a direct memory access controller coupled to said memory means for controlling the transfer of data from said memory means;

a parallel output port means coupled to said memory means and said direct memory access controller for receiving a plurality of data packets from said memory means under control of said direct memory access controller and for providing said data packets to the external device, said parallel output port means further including:

a means for developing a signal for use by the external device to indicate that each data packet is available;

a means for receiving a signal from the external device that each data packet has been accepted; and a timing control circuit for controlling the operation of said parallel output port means, comprising:

a means forming a data setup time interval, wherein said data packet is provided to the external device and said signal to indicate that each data packet is available is negated, for a first predetermined time;

a means forming a data strobe time interval following said data setup time interval, wherein said data packet is provided to the external device and said signal to indicate that each data packet is available is asserted, for a second predetermined time;

a means forming an acknowledge time interval following said data strobe time interval, wherein said signal to indicate that each data packet is available is negated; and a means forming a transfer completion time interval following said acknowledge time interval wherein said data packet is removed from provision to the external device responsive to said signal indicating that each data packet has been accepted.

12. The computer system of claim 11, wherein said parallel output port means has at least one transfer register therein.

13. The computer system of claim 12, wherein said timing control circuit furnishes the data transfer time signal to said transfer register in said parallel output port means.

14. The computer system of claim 11, wherein said external device is a parallel printer.

15. The computer system of claim 14, wherein said parallel printer has ancillary functions which are required for operation thereof and forms ancillary function signals indicative of the performance thereof.

16. The computer system of claim 15, wherein said timing control circuit includes means forming an ancillary function time interval for allowing receipt by said parallel output port means of the ancillary function signals from said parallel printer.

17. A computer system for communicating with an external device in a parallel format, comprising:

a microprocessor;

a peripheral storage device coupled to the microprocessor for storing data;

a memory coupled to said microprocessor for storing instructions and data for said microprocessor and data to be communicated to the external device;

a direct memory access controller coupled to said memory for controlling the transfer of data from said memory;

a parallel output port coupled to said memory and said direct memory access controller for receiving a plurality of data packets from said memory under control of said direct memory access controller and for providing said data packets to the external device, said parallel output port further including a circuit for developing a signal for use by the external device to indicate that each data packet is available, and a circuit for receiving a signal from the external device that each data packet has been accepted; and a timing control circuit for controlling the operation of said parallel output port to first negate the data packet available signal, thereafter assert such a signal, then subsequently negate the data packet acceptance signal and thereafter form a transfer completion time interval signal.

18. A computer system for communicating with an external device in a parallel format, comprising:

a microprocessor;

a peripheral device coupled to the microprocessor for performing peripheral functions;

a memory coupled to said microprocessor for storing instructions and data for said microprocessor and data to be communicated to the external device;

a direct memory access controller coupled to said memory for controlling the transfer of data from said memory; and a parallel output port coupled to said memory and said direct memory access controller for receiving a plurality of data packets from said memory under control of said direct memory access controller and for providing said data packets to the external device, said parallel output port further including a circuit for developing a signal for use by the external device to indicate that each data packet is available, and a circuit for receiving a signal from the external device that each data packet has been accepted.

19. The computer system of claim 18, wherein said parallel output port includes a circuit for receiving a signal from the external device that an error has occurred.

20. The computer system of claim 18, wherein said parallel output port includes a circuit for indicating to said direct memory access controller to initiate the transfer of data from said memory to said parallel output port.

21. The computer system of claim 18, wherein said direct memory access controller indicates to said parallel output port that the data transfer has been completed and where said parallel output port is coupled to said microprocessor, said parallel output port including a circuit for indicating to said microprocessor that said data transfer is completed.

22. The computer system of claim 21, wherein said parallel output port data transfer complete indicating circuit interrupts said microprocessor operation.

23. The computer system of claim 18, wherein said parallel output port is coupled to said microprocessor other than by said direct memory access controller and wherein said parallel output port includes a circuit for receiving data from said microprocessor and for providing said data to the external device.

24. The computer system of claim 23, wherein said parallel output port for receiving data from said microprocessor is disabled when said parallel output port is receiving data under control of said direct memory access controller.

25. The computer system of claim 18, wherein said parallel output port is coupled to said microprocessor and said parallel output port includes a circuit controllable by said microprocessor to initiate receipt of data by said parallel output port under control of said direct memory access controller.

26. The computer system of claim 18, wherein said direct memory access controller includes a plurality of channels and said parallel output port includes a selector circuit for selecting the channel of said direct memory access controller to be used by said parallel output port.

27. The computer system of claim 18, wherein said parallel output port can reside at a plurality of address locations.

28. A computer system for communicating with an external device in a parallel format, comprising:

a microprocessor;

a peripheral device coupled to the microprocessor for performing peripheral functions;

a memory means coupled to said microprocessor for storing instructions and data for said microprocessor and data to be communicated to the external device;

a direct memory access controller coupled to said memory means for controlling the transfer of data from said memory means;

a parallel output port means coupled to said memory means and said direct memory access controller for receiving a plurality of data packets from said memory means under control of said direct memory access controller and for providing said data packets to the external device, said parallel output port means further including:

a means for developing a signal for use by the external device to indicate that each data packet is available;

a means for receiving a signal from the external device that each data packet has been accepted; and a timing control circuit for controlling the operation of said parallel output port means, comprising:

a means forming a data setup time interval, wherein said data packet is provided to the external device and said signal to indicate that each data packet is available is negated, for a first predetermined time;

a means forming a data strobe time interval following said data setup time interval, wherein said data packet is provided to the external device and said signal to indicate that each data packet is available is asserted, for a second predetermined time;

a means forming an acknowledge time interval following said data strobe time interval, wherein said signal to indicate that each data packet is available is negated; and a means forming a transfer completion time interval following said acknowledge time interval wherein said data packet is removed from provision to the external device responsive to said signal indicating that each data packet has been accepted.

29. The computer system of claim 28, wherein said parallel output port means has at least one transfer register therein.

30. The computer system of claim 29, wherein said timing control circuit furnishes the data transfer time signal to said transfer register in said parallel output port means.

31. The computer system of claim 21, wherein said external device is a parallel printer.

32. The computer system of claim 31, wherein said parallel printer has ancillary functions which are required for operation thereof and forms ancillary function signals indicative of the performance thereof.

33. The computer system of claim 32, wherein said timing control circuit includes means forming an ancillary function time interval for allowing receipt by said parallel output port means of the ancillary function signals from said parallel printer.

34. A computer system for communicating with an external device in a parallel format, comprising:

a microprocessor;

a peripheral device coupled to the microprocessor for performing peripheral functions;

a memory coupled to said microprocessor for storing instructions and data for said microprocessor and data to be communicated to the external device;

a direct memory access controller coupled to said memory for controlling the transfer of data from said memory;

a parallel output port coupled to said memory and said direct memory access controller for receiving a plurality of data packets from said memory under control of said direct memory access controller and for providing said data packets to the external device, said parallel output port further including a circuit for developing a signal for use by the external device to indicate that each data packet is available, and a circuit for receiving a signal from the external device that each data packet has been accepted; and a timing control circuit for controlling the operation of said parallel output port to first negate the data packet available signal, thereafter assert such a signal, then subsequently negate the data packet acceptance signal and thereafter form a transfer completion time interval signal.

35. A computer system for communicating with an external device in a parallel format, comprising:

a microprocessor;

a video system coupled to the microprocessor for displaying data;

a memory coupled to said microprocessor for storing instructions and data for said microprocessor and data to be communicated to the external device;

a direct memory access controller coupled to said memory for controlling the transfer of data from said memory; and a parallel output port coupled to said memory and said direct memory access controller for receiving a plurality of data packets from said memory under control of said direct memory access controller and for providing said data packets to the external device, said parallel output port further including a circuit for developing a signal for use by the external device to indicate that each data packet is available, and a circuit for receiving a signal from the external device that each data packet has been accepted.

36. The computer system of claim 35, wherein said parallel output port includes a circuit for receiving a signal from the external device that an error has occurred.

37. The computer system of claim 35, wherein said parallel output port includes a circuit for indicating to said direct memory access controller to initiate the transfer of data from said memory to said parallel output port.

38. The computer system of claim 35, wherein said direct memory access controller indicates to said parallel output port that the data transfer has been completed and where said parallel output port is coupled to said microprocessor, said parallel output port including a circuit for indicating to said microprocessor that said data transfer is completed.

39. The computer system of claim 38, wherein said parallel output port data transfer complete indicating circuit interrupts said microprocessor operation.

40. The computer system of claim 35, wherein said parallel output port is coupled to said microprocessor other than by said direct memory access controller and wherein said parallel output port includes a circuit for receiving data from said microprocessor and for providing said data to the external device.

41. The computer system of claim 40, wherein said parallel output port for receiving data from said microprocessor is disabled when said parallel output port is receiving data under control of said direct memory access controller.

42. The computer system of claim 35, wherein said parallel output port is coupled to said microprocessor and said parallel output port includes a circuit controllable by said microprocessor to initiate receipt of data by said parallel output port under control of said direct memory access controller.

43. The computer system of claim 35, wherein said direct memory access controller includes a plurality of channels and said parallel output port includes a selector circuit for selecting the channel of said direct memory access controller to be used by said parallel output port.

44. The computer system of claim 35, wherein said parallel output port can reside at a plurality of address locations.

45. A computer system for communicating with an external device in a parallel format, comprising:

a microprocessor;

a video system coupled to the microprocessor for displaying data;

a memory means coupled to said microprocessor for storing instructions and data for said microprocessor and data to be communicated to the external device;

a direct memory access controller coupled to said memory means for controlling the transfer of data from said memory means;

a parallel output port means coupled to said memory means and said direct memory access controller for receiving a plurality of data packets from said memory means under control of said direct memory access controller and for providing said data packets to the external device, said parallel output port means further including:

a means for developing a signal for use by the external device to indicate that each data packet is available;

a means for receiving a signal from the external device that each data packet has been accepted; and a timing control circuit for controlling the operation of said parallel output port means, comprising:

a means forming a data setup time interval, wherein said data packet is provided to the external device and said signal to indicate that each data packet is available is negated, for a first predetermined time;

a means forming a data strobe time interval following said data setup time interval, wherein said data packet is provided to the external device and said signal to indicate that each data packet is available is asserted, for a second predetermined time;

a means forming an acknowledge time interval following said data strobe time interval, wherein said signal to indicate that each data packet is available is negated; and a means forming a transfer completion time interval following said acknowledge time interval wherein said data packet is removed from provision to the external device responsive to said signal indicating that each data packet has been accepted.

46. The computer system of claim 45, wherein said parallel output port means has at least one transfer register therein.

47. The computer system of claim 46, wherein said timing control circuit furnishes the data transfer time signal to said transfer register in said parallel output port means.

48. The computer system of claim 45, wherein said external device is a parallel printer.

49. The computer system of claim 48, wherein said parallel printer has ancillary functions which are required for operation thereof and forms ancillary function signals indicative of the performance thereof.

50. The computer system of claim 49, wherein said timing control circuit includes means forming an ancillary function time interval for allowing receipt by said parallel output port means of the ancillary function signals from said parallel printer.

51. A computer system for communicating with an external device in a parallel format, comprising:

a microprocessor;

a video system coupled to the microprocessor for displaying data;

a memory coupled to said microprocessor for storing instructions and data for said microprocessor and data to be communicated to the external device;

a direct memory access controller coupled to said memory for controlling the transfer of data from said memory;

a parallel output port coupled to said memory and said direct memory access controller for receiving a plurality of data packets from said memory under control of said direct memory access controller and for providing said data packets to the external device, said parallel output port further including a circuit for developing a signal for use by the external device to indicate that each data packet is available, and a circuit for receiving a signal from the external device that each data packet has been accepted; and a timing control circuit for controlling the operation of said parallel output port to first negate the data packet available signal, thereafter assert such a signal, then subsequently negate the data packet acceptance signal and thereafter form a transfer completion time interval signal.

* * * * *